United States Patent
Oba et al.

(10) Patent No.: US 8,988,706 B2
(45) Date of Patent: Mar. 24, 2015

(54) PRINTER DATA COLLECTION CABLE

(75) Inventors: Kazutaka Oba, Johns Creek, GA (US); Tomoki Hattori, Duluth, GA (US)

(73) Assignee: Ricoh Company, Ltd., Tokyo (JP)

( * ) Notice: Subject to any disclaimer, the term of this patent is extended or adjusted under 35 U.S.C. 154(b) by 951 days.

(21) Appl. No.: 12/765,206

(22) Filed: Apr. 22, 2010

(65) Prior Publication Data

US 2011/0261391 A1    Oct. 27, 2011

(51) Int. Cl.
*G06F 3/12* (2006.01)
*G06K 15/00* (2006.01)
*G03G 21/02* (2006.01)
*G03G 15/00* (2006.01)

(52) U.S. Cl.
CPC ............ *G06F 3/1284* (2013.01); *G06F 3/1203* (2013.01); *G06F 3/1236* (2013.01)
USPC .............. 358/1.15; 358/1.14; 399/79; 399/80

(58) Field of Classification Search
None
See application file for complete search history.

(56) References Cited

U.S. PATENT DOCUMENTS

| | | | |
|---|---|---|---|
| 5,088,051 A * | 2/1992 | Forsythe et al. | 358/1.18 |
| 6,665,086 B2 * | 12/2003 | Hull et al. | 358/1.15 |
| 2001/0028473 A1 * | 10/2001 | Yamasaki et al. | 358/1.15 |
| 2001/0043352 A1 * | 11/2001 | Brossman et al. | 358/1.13 |
| 2003/0069915 A1 * | 4/2003 | Clough et al. | 709/100 |
| 2003/0164977 A1 * | 9/2003 | Aagesen | 358/1.15 |
| 2003/0227643 A1 * | 12/2003 | Reddy et al. | 358/1.13 |
| 2005/0286068 A1 * | 12/2005 | Johnson et al. | 358/1.14 |
| 2007/0233834 A1 | 10/2007 | Hattori et al. | |
| 2007/0234354 A1 | 10/2007 | Hattori | |
| 2007/0245358 A1 | 10/2007 | Hattori et al. | |
| 2007/0263235 A1 * | 11/2007 | Oomura et al. | 358/1.4 |
| 2007/0297007 A1 * | 12/2007 | Zimmerman | 358/1.15 |
| 2008/0231886 A1 | 9/2008 | Wehner et al. | |
| 2008/0235241 A1 | 9/2008 | Hattori et al. | |
| 2009/0059272 A1 | 3/2009 | Matsushita et al. | |
| 2010/0027054 A1 * | 2/2010 | Reddy et al. | 358/1.15 |

* cited by examiner

*Primary Examiner* — King Poon
*Assistant Examiner* — Vincent Peren
(74) *Attorney, Agent, or Firm* — Cooper & Dunham LLP

(57) ABSTRACT

Apparatuses, systems and methods are provided for managing and exchanging printer data.

17 Claims, 20 Drawing Sheets

Fig. 4

| USER PRINT COUNT DATA | | | | |
|---|---|---|---|---|
| User | Print Job ID | Total Pages Printed | Color Pages Printed | Authorized Printing Device(s) |
| John.Smith | A, E | 48 | 48 | Ricoh Aficio 456 |
| Jane.Doe | B, D | 231 | 231 | Ricoh Aficio 456 HP Printer 123 |
| Kevin.Sample | C, F | 117 | 0 | Ricoh Aficio 456 IBM Printer 999 |
| ... | ... | ... | ... | ... |
| ... | ... | ... | ... | ... |
| ... | ... | ... | ... | ... |

Fig. 5

| PRINT JOB DATA ||||||||
| Print Job ID | User | Printing Device | Pages | Color Pages | Simplex /Duplex | N-Up? | Status |
| --- | --- | --- | --- | --- | --- | --- | --- |
| A | John. Smith | Ricoh Aficio 456 | 10 | 10 | Simplex | No | Done |
| B | Jane.Doe | Ricoh Aficio 456 | 146 | 146 | Simplex | No | Done |
| C | Kevin.Sample | IBM Printer 999 | 117 | 0 | Simplex | No | Done |
| D | Jane.Doe | HP Printer 123 | 85 | 85 | Simplex | No | Done |
| E | John.Smith | Ricoh Aficio 456 | 38 | 38 | Duplex | Yes | Done |
| F | Kevin.Sample | IBM Printer 999 | 3 | 0 | Duplex | No | Pending |
| ... | ... | ... | ... | ... | ... | ... | ... |
| ... | ... | ... | ... | ... | ... | ... | ... |
| ... | ... | ... | ... | ... | ... | ... | ... |

Fig. 8

| PRINTER SPECIFICATION DATA | | | | | | | |
|---|---|---|---|---|---|---|---|
| Printing Device Name | Location | IP Address | Color or Mono | Simplex or Duplex | N-Up? | PDL Formats | Status |
| HP Printer 123 | Conference Room A | 123.00.111.0 | Color | Simplex | No | PCL | Not connected |
| Ricoh Aficio 456 | First Floor Lobby | 456.00.111.0 | Color | Duplex | Yes | PostScript | Ready |
| IBM Printer 999 | Room 1249 | 999.00.111.0 | Mono | Duplex | Yes | PCL PostScript | Not connected |
| ... | ... | ... | ... | ... | ... | ... | ... |
| ... | ... | ... | ... | ... | ... | ... | ... |
| ... | ... | ... | ... | ... | ... | ... | ... |

PRINTER DATA COLLECTION CABLE

TECHNICAL FIELD

This disclosure relates to systems, apparatuses and methodologies for managing and exchanging printer data.

BACKGROUND

In the current information age, printing devices such as traditional printers and Multi-Function Products (MFPs) have become extensively used in enterprise and other organization environments. Various computing devices including user terminals may be connected to a printing device, in order to transmit a print job to the printing device.

Conventionally, one way to connect a computing device to a printing device is with the use of a printer cable. As seen in FIG. 1A, a printer cable 13, which may be a Universal Serial Bus (USB) cable, acts as a simple conduit or data bus that allows two-way communication of electronic information between a terminal 12 and a printing device 15. The printer cable allows the terminal to transmit print data to the printing device, whereby the printing device may perform a print job based on the received print data. Furthermore, the printer cable also allows the printing device to transmit information back to the terminal, such as status information regarding the printing device (device ready, low cartridge ink/toner, etc. . . . ) or status information regarding a print job (completed, pending, canceled, etc. . . . ).

However, the simplicity of conventional printer cables also creates a drawback, in that there are limited security measures available with respect to controlling whether a computing device is able to be connected via the printer cable to a given printing device. For example, it may be desirable to limit the use of a given printing device to only a specific group of users and their corresponding computing devices. However, with a conventional printer cable, any user may easily connect their computing device to the printing device via the printer cable in order to attempt to perform a print job on the printing device.

Furthermore, there is the drawback in that it is difficult to obtain accurate accounting records regarding print jobs that have been performed on a specific printing device. For example, over a period of time a number of different users may connect their computing devices to a printing device with a printer cable in order to perform print jobs. Some of these computing devices (such as a notebook computer belonging to an outside individual visiting an enterprise organization) may rarely be connected to the particular printing device, and some printing devices may not have the capacity to locally store large amounts of print job statistics and billing data. Thus, conventional printer cables make it difficult to obtain a centralized record of print billing and accounting information (such as information regarding which users have printed documents on a printing device, how many pages each user has printed, and so forth).

Moreover, a printer cable is unable to extract or store data being communicated between the terminal and the printer. Thus, a drawback arises when there is an interruption in the transmission of print data from the terminal to the printing device, as a result of a printer cable becoming disconnected from either the terminal or the printing device. In such a situation, the print data may be temporarily lost while being transmitted over the printer cable. Further, even if the connection provided by the printer cable is properly reestablished at a later time, it may be necessary for the terminal to generate and retransmit the print data to the printing device at the later time, thereby causing great inconvenience to the users of the terminal.

Alternatively, another conventional manner in which computing devices are connected to printing devices is with the use of a dedicated printer server. Such print servers are common in enterprise organizations, and allow numerous terminals to be connected simultaneously to numerous printing devices.

With reference to FIG. 1B, a conventional print server 14 is connected to the data network 11, as are terminal 12 and printing device 15. The printer server 14 may receive a print request command from the terminal 12, for performing a print job at the printing device 15. The print server 14 then transmits the print request command, along with any associated print data and print job information, through the network 11 to the printing device 15, and receives data from the printing device 15 in response to the print request command. The print server 15 may then transmit the data returned from the printing device 15 to the terminal 12 as necessary.

There is a drawback, however, in that dedicated print servers are often large and complicated devices, which may be prohibitively expensive for many enterprise organizations. For example, such print servers often need to be maintained and monitored by dedicated Information Technology (IT) professionals.

Furthermore, there is the drawback that a computing device must be connected to a data network infrastructure to which both the print server and the desired printing device are connected, in order for the computing device to be able to transmit the print request and the print data to the desired printing device. This may prove inconvenient, especially if a particular computing device is not often or not easily connected to the data network (such as a notebook computer belonging to an outside individual visiting an enterprise organization).

There exists a need for an improved approach for managing the transmission of print data transmitted between a terminal and a printer, using techniques that are efficient and not as difficult to use (as a practical matter).

SUMMARY

This disclosure provides tools (in the form of systems, apparatuses and methodologies) for managing and exchanging printer data.

In an aspect of this disclosure, a printer data collection cable configured for wired connections to a terminal and to a printing device, respectively, comprises: a first interface including a first wired cable having a first connector at an end thereof conforming to a terminal connector standard, the first interface being configured for communication through the first wired cable with the terminal when the first connector at the end of the first wired cable is connected to the terminal; a second interface including a second wired cable having a second connector at an end thereof conforming to a printer connector standard, the second interface being configured for communication through the second wired cable with the printing device when the second connector at the end of the second wired cable is connected to the printing device; a data collection and processing part configured to pass a print job received through the first interface from the terminal, to the printing device through the second interface, while collecting print job data; and a storing part configured to store the print job data collected by said data collection and processing part.

In another aspect, a storing part of a printer data collection cable stores, for each print job received through a first interface of the printer data collection cable from a terminal, print images, and the stored print images are available for retrieval.

In another aspect, a data collection and processing part of a printer data collection cable determines, based on a print job received through a first interface of the printer data collection cable from a terminal, (a) an identity of user submitting the print job and (b) the number of pages in the print job, and print job data for the received print job stored in a storing part of the printer data collection cable includes the identity of the user and the number of pages in the received print job.

In another aspect, a data collection and processing part of a printer data collection cable maintains and registers for each of a plurality of specific users, user print count data including a total number of pages printed by a printing device from print jobs submitted by the specific user.

In another aspect, a data collection and processing part of a printer data collection cable maintains and registers for each of a plurality of specific users, user print count data including a total number of color print pages printed by a printing device from print jobs submitted by the specific user.

In another aspect, a wireless communication part of a printer data collection cable is configured to communicate collected print job data, upon demand or at a specific time, to an external data collection device, wherein the printer data collection cable registers a data reporting setting to one of push-type reporting and pull-type reporting, and when the printer data collection cable is set to the push-type reporting, the printer data collection cable communicates the collected print job data at the specific time to the external data collection device, and when the printer data collection cable is set to the pull-type reporting, the printer data collection cable communicates the collected print job data to the external data collection device upon receipt of a command from the external data collection device.

In another aspect, a wireless communication part of a printer data collection cable communicates device identification data in addition to collected print job data, to an external data collection device, the device identification data uniquely identifying the printer data collection cable.

In another aspect, a data collection and processing part of a printer data collection cable appends an output format command to a print job passed to a printing device, and the output format command instructs the printing device to output a printout of a print job in a format specified by the output format command, in accordance with a print policy.

In another aspect, a data collection and processing part of a printer data collection cable registers for each printer, information indicating print job formats acceptable to the printer, and when a print job received from a terminal is in a format that is not one of the print job formats acceptable to the printing device, the data collection and processing part converts the print job received from the terminal to a converted print job that is in one of the print job formats acceptable to the printing device and passes the converted print job to the printing device.

In another aspect, a data collection and processing part of a printer data collection cable receives, through a second interface of the printer data collection cable, from each printing device connected to the printer data collection cable, printer identification data identifying the connected printing device, and the data collection and processing part registers the printer identification data to track all of the printing devices that have been connected to the printer data collection cable.

In another aspect of this disclosures, a terminal, without a print driver for a printing device, communicates a print job to a printer data collection cable, and a data collection and processing part of the printer data collection cable registers for each printer, information indicating print job formats acceptable to the printer, and when the data collection and processing part receives the print job from the terminal, the data collection and processing part converts the print job received from the terminal to a converted print job that is in one of the print job formats acceptable to the printing device and passes the converted print job to the printing device.

In another aspect, a terminal registers an access code and transmits the access code along with a print job to a printer data collection cable, and a data collection and processing part of the printer data collection cable passes the print job, received from the terminal, to a printing device, only if the data collection and processing part authenticates access by the terminal based on the received access code.

In another aspect of this disclosure, a printing device includes an access authentication part, and a printer data collection cable registers an access code and transmits the access code along with a print job to the printing device, and the printing device processes the print job only if the access authentication part authenticates the print job based on the received access code.

BRIEF DESCRIPTION OF THE DRAWINGS

The above-mentioned and other features, aspects and advantages can be more readily understood from the following detailed description with reference to the accompanying drawings wherein:

FIG. 4 shows an example of user print count data;

FIG. 5 shows an example of print job data;

FIG. 8 shows an example of printer specification data;

DETAILED DESCRIPTION

Figure 1A:
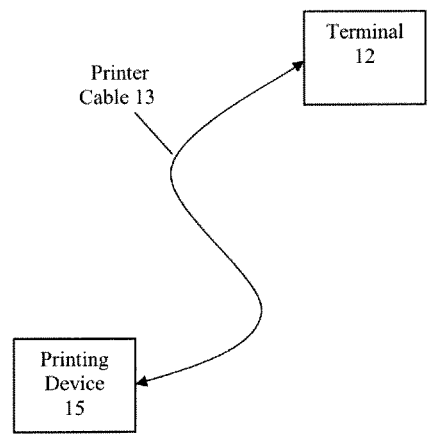
FIG. 1A shows a block diagram of a conventional system.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Figure 2A:
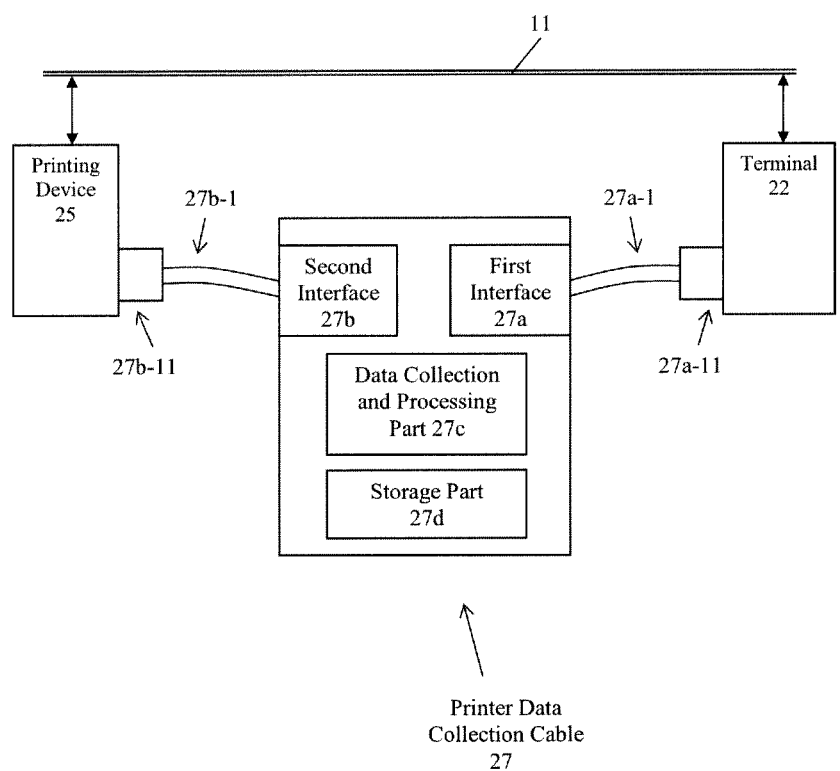
FIG. 2A shows a block diagram of a system, according to an exemplary embodiment of this disclosure.

Referring now to the drawings, wherein like reference numerals designate identical or corresponding parts throughout the several views, FIG. 2A shows schematically a system 200 for managing and exchanging printer data, according to an exemplary embodiment of this disclosure.

System 200 includes a terminal 22, a printing device 25, and a printer data collection cable 27. The printer data collection cable 27 is directly connected to the terminal 22 and to the printing device 25, as will be described below. The terminal 22 and the printing device 25 are also interconnected by a network 11. (In the interests of clarity, FIG. 2B reproduces only the printer data collection table 27 shown in FIG. 2A).

Figure 1B:
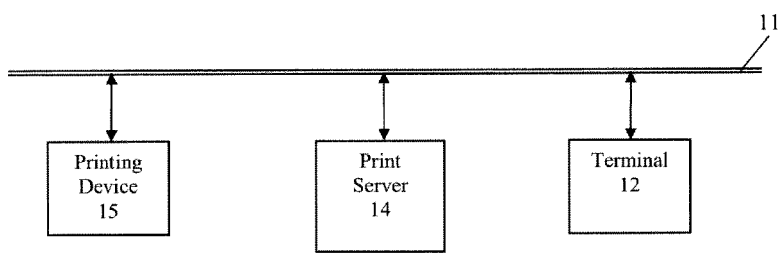
FIG. 1B shows a block diagram of another conventional system.

The terminal 22 and the printing device 25 may be substantially similar to the terminal 12 and the printing device 15 depicted in FIG. 1B, respectively. Alternatively, the terminal 22 and the printing device 25 may have a different configuration from the terminal 12 and the printing device 15, respectively. The terminal 22 is configured with software allowing the terminal to generate a print job, and transmit the print job to the network 11.

Printer data collection cable 27 includes a first interface 27a, a second interface 27b, a data collection and processing part 27c, and a storing part 27d.

The first interface 27a includes a first wired cable 27a-1 having a first connector 27a-11 at one end of the first wired cable 27a-1. The first connector 27a-11 may conform to a terminal connector standard, such as the Universal Serial Bus (USB) standard type "A" plug. In this way, when the first connector 27a-11 of the first wired cable 27a-1 is connected to the terminal 22, data can be communicated between the terminal 22 and the first interface 27a of the printer data collection cable 27. Such data may include a print job transmitted from the terminal 22.

Similarly, the second interface 27b includes a second wired cable 27b-1 having a second connector 27b-11 at one end of the second wired cable 27b-1. The second connector 27b-11 may conform to a printer connector standard, so as to be connectable to a printing device. An example of a connector conforming to a printer connector standard includes a Universal Serial Bus (USB) standard type "B" connector plug. In this way, when the second connector 27b-11 of the second wired cable 27b-1 is connected to the printing device 25, data can be communicated between the second interface 27b of the printer data collection cable 27 and the printing device 25. Such data may include a print job received at the printer data collection cable 27 from the terminal 22 that may be passed on to the printing device 25, as will be discussed below.

The data collection and processing part 27c is configured to electronically forward or 'pass' a print job received through the first interface 27a from the terminal 22, to the printing device 25 through the second interface 27b. While the data collection and processing part 27c is passing the print job received from the terminal 22 to the printing device 25, the data collection and processing part 27c may analyze the various data of the print job in order to extract and collect print job data from the print job.

The print job data may include any number of the following items of information relating to the print job:
  (i) print job ID information identifying the print job;
  (ii) the identity of a user who submitted the print job (who may correspond to a user of the terminal 22);
  (iii) the printing device selected to perform the print job (i.e. output a printout of print image data in the print job);
  (iv) the number of pages in the print job;
  (v) the number of color pages and monochrome pages in the print job;
  (vi) whether the print job is to be printed in simplex format (image data output on only one side of a sheet of paper) or duplex format (image data output on both sides of a sheet of paper);
  (vii) whether the print job is to be printed in an N-up format (multiple pages of image data on one sheet of paper);
  (viii) an author of a subject/source file of the print job, and the time at which the subject/source file of the print job was created; and
  (ix) the identity of the terminal 22 that transmitted the print job.

It is acceptable for the data collection and processing part 27c to selectively extract and collect only one or more of the above-mentioned types of information.

The storing part 27d is configured to store the print job data collected by the data collection and processing part 27c.

While the data collection and processing part 27c is passing the print job received through the first interface 27a from the terminal 22 to the printing device 25 through the second interface 27b, the data collection and processing part 27c may also extract print images from the print job, where the print images correspond to the images of the print job that are designed for output by the printing device 25. The extracted print images may be stored in the storing part 27d, where they may be accessed at a later time for retrieval. For example, the print images may be retrieved by the terminal 22 (as will be discussed later with reference to FIG. 14).

In an embodiment of this disclosure, the print job passed by the printer data collection cable 27 to the printing device 25 through the second interface 27b is unaltered from the print job received through the first interface 27a from the terminal 22.

In this way, the printer data collection cable 27 including the first interface 27a and the second interface 27b provides a bi-directional communication medium between the terminal 22 and the printing device 25. Moreover, the operation of the printer data collection cable 27 is transparent to the terminal 22 and the printing device 25; the terminal 22 and the printing device 25 may operate and communicate with each other as if the printer data collection cable 27 was a simple bus or conduit, such as a conventional USB printer cable. That is, the terminal 22 is not required to alter the print job specifically for transmission through the printer data collection cable 27 to the printer 25.

Thus, according to this exemplary embodiment of the present invention, there is provided the tools for the efficient exchange and management of printer data. Whereas printer cables of the prior art are unable to extract and collect print job data from a print job being transmitted through the conventional cable, the printer data collection cable of this disclosure collects print job data and print images being passed from a terminal to a printing device, and stores the collected print job data locally on the printer data collection cable so that they are available for later retrieval.

The printer data collection cable 27, in this exemplary embodiment, is distinct from any print server, such as the print server 14 seen in FIG. 1B. Thus, whereas the techniques of the prior art may rely on a dedicated printer server, the printer data collection cable 27 of this disclosure is configured for use independently of the operation of any print server. The print data collection cable is not an unwieldy or prohibitively expensive device, and does not require maintenance and monitoring by dedicated IT professionals. Hence, the operational convenience to users of the present invention is greatly increased.

Figure 2B:
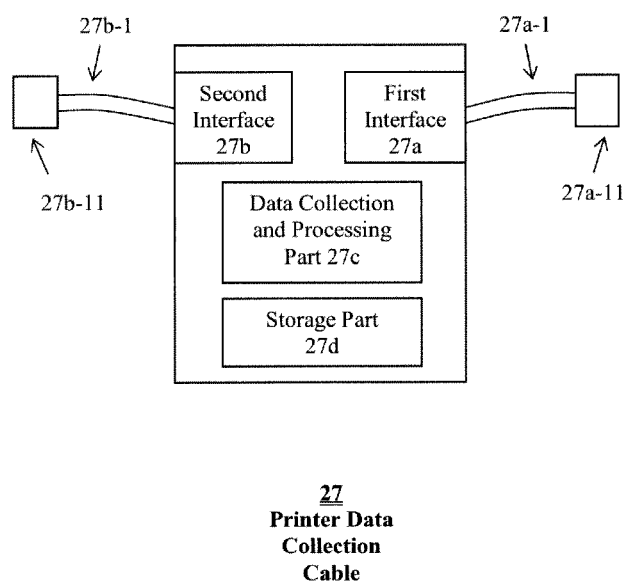
FIG. 2B shows a schematic of a printer data collection cable.
Figure 3:
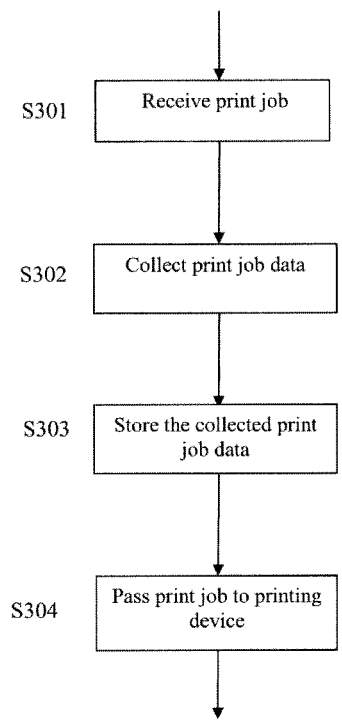
FIG. 3 shows a flow chart of a workflow on a printer data collection cable side, in an exemplary embodiment.

Turning to FIG. 3, a flow chart is shown illustrating an example of a workflow on a printer data collection cable side (such as the printer data collection cable 27 in FIGS. 2A and 2B).

Firstly, in step S301, the printer data collection cable receives a print job from a terminal.

Thereafter, in step S302, the printer data collection cable collects print job data from the print job. For instance, the printer data collection cable may analyze the various data of the print job and extract and collect pertinent print job data from the print job. The collected print job data may include, for example, information identifying a user that is sending the print job, the number of pages in the print job or the number of color pages in the print job.

In step S303, the printer data collection cable stores the collected print job data that was collected in S302, in a storing part of the printer data collection cable.

Finally, in step S304, the printer data collection cable passes the print job received in S301 to a printing device. The printing device may then execute the print job. It will be appreciated that the order of steps S303 and S304 may be interchanged.

Although not shown, the printer data collection cable may also receive information from the printing device, and transmit a portion or the entirety of this information back to the terminal. In this way, the printer data collection cable allows the printing device to transmit information back to the terminal, such as status information regarding the printing device (device ready, low cartridge ink/toner, etc. . . . ) or status information regarding a print job (completed, pending, canceled, etc. . . . ).

According to another aspect of this disclosure, the data collection and processing part 27c of the printer data collection cable 27 also maintains and registers user print count data for each of a plurality of specific users (who may correspond to users of one or more terminals, such as the terminal 22 for example). The print count data includes any one of: a total number of pages printed by a printing device from print jobs submitted by the specific user; and a total number of color print pages printed by the printing device from print jobs submitted by the specific user.

The user print count data may be generated by processing the print job data of print jobs that are received at the printer data collection cable 27 from terminals such as the terminal 22.

More specifically, the data collection and processing part 27c may generate the user print count data by determining, based on the collected print job data of each print job received at the printer data collection cable: (a) an identity of a user sending the print job and (b) the number of pages in the print job and/or the number of color pages in the print job.

FIG. 4 depicts an example of user print count data, which may be maintained in the storing part 27d of the printer data collection cable 27. The user print count data identifies a plurality of specific users (who may correspond to users of the terminal 22). The user print count data may also include for each of the plurality of specific users the corresponding print jobs (identified by Print Job ID) associated with the specific user, the total number of pages that have been printed by a printing device from print jobs submitted by the specific user, the total number of color print pages printed by a printing device from print jobs submitted by the specific user, and the authorized printing devices that each specific user is authorized to use.

For example, the registered user John.Smith has performed print job A and E, has printed 48 pages in total and 48 color pages in total, and is permitted to only use the Ricoh Aficio 456.

It is possible for more than one authorized printing device to correspond to a user. For example, it may be seen that two authorized printing devices correspond to the user Jane.Doe, the Ricoh Aficio 456 and the HP Printer 123.

The user print count data may also include printer rights (not shown) that the user is permitted to exercise, such as whether each user is permitted to perform color printing, duplex printing, N-up printing, and so forth.

It should be appreciated that the user print count data contained within the user print count data table is not limited to that shown in FIG. 4, which merely illustrates an example. In particular, while the user print count data shown FIG. 4 includes usernames, print job ID information, total pages printed, color pages printer and authorized printing device information, the user print count data can in addition store various other information, including information that may be used to identify a user of a terminal that may be communicating print data with a printer. For example, the user print count data can include user authentication information, which may include a plurality of passwords, codes, names, screen names, email addresses, telephone numbers, facsimile numbers, etc. The user authentication information may include biometric information (such as fingerprints, palm prints, voice or speech, retinas or irises, facial expressions or features, signature, etc).

Thus, the data collection and processing part 27c of the printer data collection cable 27 maintains and registers user print count data for each of a plurality of specific users. The user print count data may include a total number of pages printed by the printing device from print jobs submitted by the specific user, and/or a total number of color print pages printed by the printing device from print jobs submitted by the specific user.

FIG. 5 shows an example of print job data that may be maintained by the data collection and processing part 27c. The print job data is collected by the data collection and processing part 27c from a print job, and stored in the storing part 27d.

The print job data includes a plurality of Print Job IDs, corresponding to each of the print jobs that have been executed via the printer data collection cable. Preferably, the print job IDs are listed in chronological order, so that print job A is the first (earliest) print job executed via the printer data collection cable, print job B is the second print job executed via the printer data collection cable, and so forth. For each of the print job IDs, the print job data may include the following information corresponding to the print job ID:

the specific user that initiated the print job;
the specific printing device that performed the print job;
the number of pages in the print job;
the number of color pages in the print job;
whether the print job was executed in simplex format (image output only on one side of a sheet of paper) or in duplex format (image output on both sides of a sheet of paper);
whether the print job involved N-up printing (multiple pages of image data on one sheet of paper); and
the status of the print job (done, pending, etc. . . . ).

For print job E, for example, it can be seen that the user that requested the print job is John.Smith, the printing device that performed the print job is the Ricoh Aficio 456, the number of pages in the print job is 38, the number of color pages is 38, the print job was performed using the duplex printing format, the print job employed an N-up printing format, and the print job has already been completed.

According to another aspect of this disclosure, the printer data collection cable only needs to be connected to one of the terminal and the printing device at a given time.

Figure 6A:
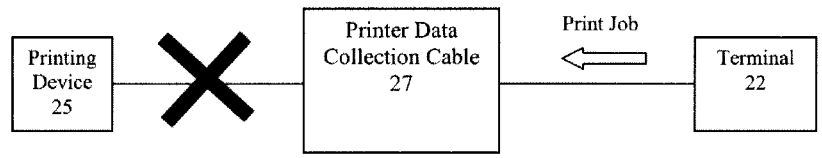
FIGS. 6A and 6B depict aspects of another exemplary embodiment of this disclosure.

With reference to FIG. 6A, it can be seen that if the printer data collection cable 27 is connected to the terminal 22, then the printer data collection cable can still receive a print job from the terminal 22 (and collect and store print job data and print images from the print job), even if the printer data collection cable is not connected to the printing device 25.

Of course, the printer data collection cable 27 will not be able to pass the print job to the printing device 25, if the printer data collection cable is unable to communicate with the printing device 25 (which may be the case when the printer data collection cable 27 is not connected to the printing device 25, as seen in FIG. 6A).

Figure 6B:
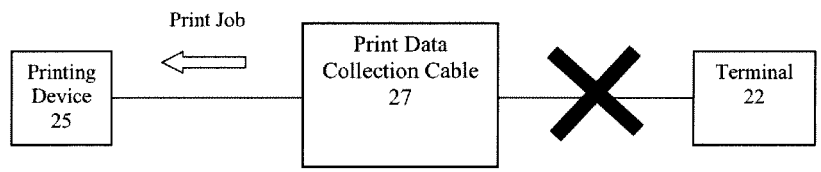

Once the printer data collection cable 27 is connected to the printing device 25, the cable 27 can pass the print job received from the terminal 22 to the printing device 25, even if the cable 27 is no longer connected to the terminal 22, as seen in FIG. 6B.

Thus, whereas conventional USB printer cables may allow print data to be temporarily lost when there is an interruption in the transmission of print data from the cable to the printing device (as a result of a USB printer cable becoming disconnected from either the terminal or the printing device, for example), the printer data collection cable of this disclosure may collect and store the print job. In this way, if the connection provided by the printer management cable is properly reestablished at a later time, the stored data may be properly transmitted to the printing device, thereby avoiding the need for the terminal to regenerate and retransmit the print job.

According to another aspect of this disclosure, the data collection and processing part 27c of the printer data collection cable 27 appends an output format command to the print job passed to the printing device 25. The output format command instructs the printing device 25 to output the printout of the print job in a format specified by the output format command, in accordance with a print policy.

For example, a print policy in an enterprise organization may state that all print jobs of presentation slide information must be executed using a 2-up printing format, which entails outputting 2 pages of image data on one side of a single sheet of paper. Thus, the appended output format command may instruct the printing device 25 to output the printout of the print jobs in a duplex format, in accordance with the print policy of the enterprise organization.

According to another aspect of this disclosure, the terminal 22 registers an access code and transmits h access code along with the print job to the printer data collection cable 27. Thereafter, the data collection and processing part 27c of the printer data collection cable 27 passes the print job, received from the terminal 22, to the printing device 25, only if the data collection and processing part authenticates access by the terminal 22 based on the received access code.

The terminal 22 may include a network interface, and the terminal 22 requests and receives the access code through a network from an external authentication code source (not shown).

The data collection and processing part 27c may compare the received access code to verified access codes, which are stored remotely or locally in the storing part 27d of the cable, in order to authenticate access by the terminal 22. The data collection and processing part 27c may request and receive the verified access codes through a network from an external authentication code source (not shown).

Thus, while conventional USB printer cables allow any user to connect their computing device to a printing device via a USB printer cable with limited or no security measures available, the printer data collection cable of this disclosure may limit the use of a given printing device only to authorized users.

Figure 7A:
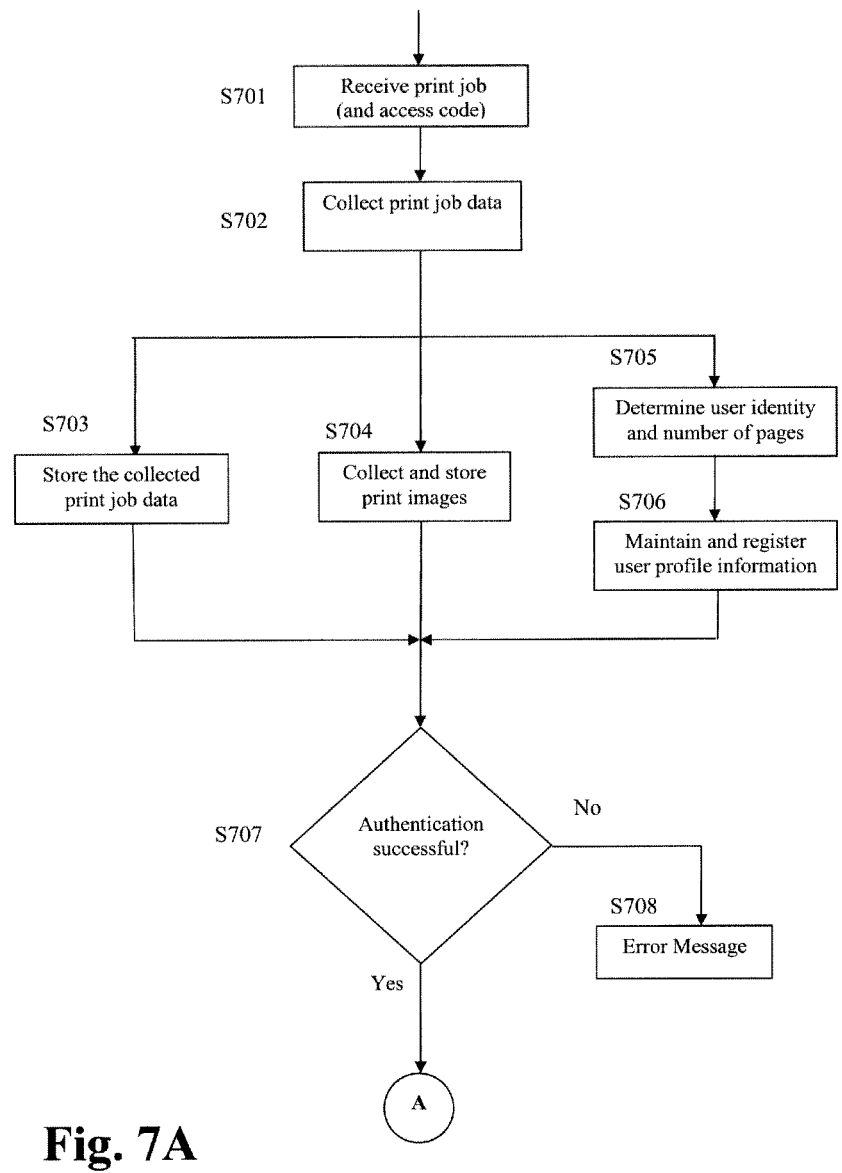
FIGS. 7A and 7B shows a flow chart of a more detailed workflow on a printer data collection cable side, in another exemplary embodiment.
Figure 7B:
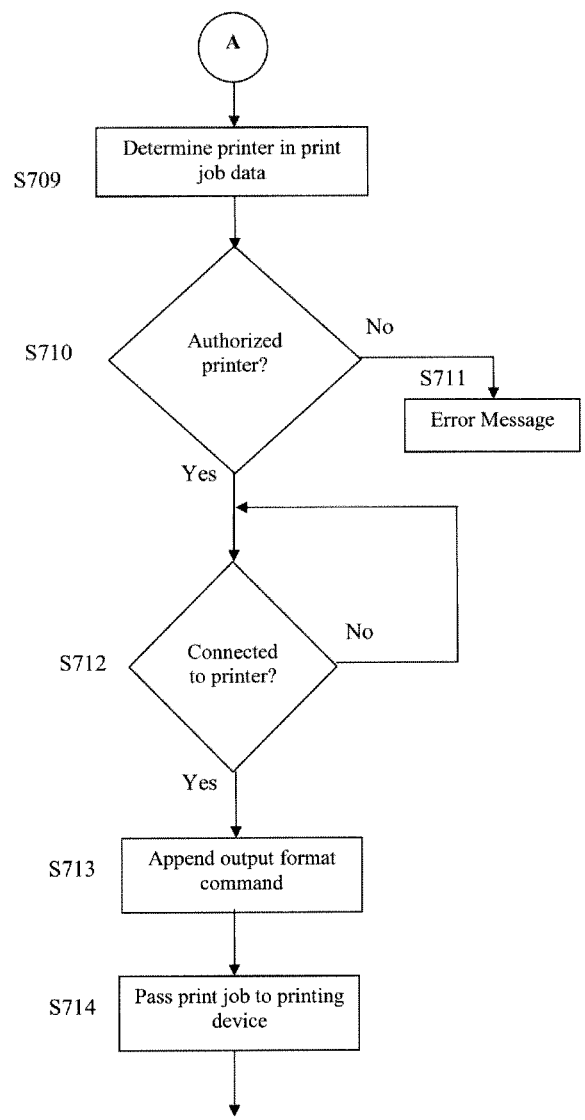

In FIGS. 7A and 7B, a flow chart is shown illustrating an example of a more detailed workflow on a printer data collection cable side (such as the printer data collection cable 27 in FIGS. 2A and 2B).

Firstly, in step S701, the printer data collection cable receives a print job from a terminal. The print may be accompanied by an access code from the terminal.

In step S702, the printer data collection cable collects print job data from the print job. The collected print job data may include, for example, information identifying a user that is sending the print job, the number of pages in the print job, the number of color pages in the print job, a selected printing device, and so forth.

Using an example in reference to FIG. 5, assume the received print job corresponds to the print job ID F. In this case, the username of the user issuing the print request is Kevin.Sample, and the selected printing device is the IBM Printer 999.

The workflow may then simultaneously proceed to one of three parallel workflows, beginning with S703, S704 and S705, respectively. (The parallel workflows may be performed simultaneously, or consecutively in any order).

In step S703, the printer data collection cable stores the collected print job data that was collected in S702, in a storing part of the printer data collection cable.

In step S704, the printer data collection cable collects print images from the print job, and stores the print images so that they are available for later retrieval.

In step S705, the printer data collection cable determines, based on the received print job at least (a) an identity of a user sending the print job and (b) the number of pages in the print job and/or the number of color pages in the print job.

The printer data collection cable then maintains and registers user print count data in S706, based on the determinations made in S705. Specifically, the user print count data includes any one of: a total number of pages printed by a printing device from print jobs submitted by the specific user; and a total number of color print pages printed by the printing device from print jobs submitted by the specific user. An example of user print count data is seen in FIG. 4.

Thereafter, in S707, the printer data collection cable authenticates the terminal that issued the print job, based on the access code received in S701. For example, the printer data collection cable may compare the received access code with a verified access code stored locally on the printer data collection cable. (Alternatively, the printer data collection cable may connect to an external source in order to obtain the verified access code).

The access code can include a password, a plurality of names and/or screen names, email addresses, telephone numbers, facsimile numbers, etc. The user access information may include biometric information (such as fingerprints, palm prints, voice or speech, retinas or irises, facial expressions or features, signature, etc).

If the user authentication in not successful (S707, no), then the printer data collection cable transmits an error message back to the terminal in step S708, which may displayed on an output device of the user terminal for a user to view. The displayed error message may inform the user that the authentication process was not successful, and that the user may require the assistance of a system administrator in order to continue. The process then ends.

If the user authentication is successful (S707, yes), then the printer data collection cable analyzes the print job data received from the terminal and determines what the selected printing device is, in step S709. For example, in the case of print job F in FIG. 5, it will be determined that the selected printing device is the IBM Printer 999.

Thereafter, in step S710, the print management system determines whether the selected printing device, as determined in S709, is in fact an authorized printing device with respect to the user issuing the print request. In order to make this determination, the printer data collection cable may refer to the user print count data stored locally on the cable, and specifically refers to the user print count data corresponding to a user of the terminal that issued the print job. An example of such user print count data is depicted in FIG. 4.

If it is determined that the selected printing device is not an authorized printing device for the user that issued the print job (S710, no), then the printer data collection cable generates and transmits and error message to the terminal, which may be presented on a display part of the terminal for the user to view, in step S711. For example, the error message may inform the user that there was an error because the user is not authorized to utilize the printing device that the user has requested for the current print job. The process then ends.

If it is determined that the selected printing device is an authorized printing device for the user that issued the print request (S710, yes), then the printer data collection cable determines whether the desired printing device is connected to the printer data collection cable in S712. Put another way, the printer data collection cable determines whether the cable can communicate with the printing device corresponding to the selected printing device. For example, the printer data collection cable may transmit a query to the selected printing device, and determine if the selected printing device has transmitted an appropriate reply/response back to the cable.

If it is determined that the printer data collection cable is not connected to the selected printing device (S712, no), then the printer data collection cable continues to determine whether the printer data collection cable is connected to the selected printing device (S712). Put another way, the print management continues to attempt to communicate with the selected printing device, as described above.

If it is determined that the printer data collection cable is connected to the selected printing device (S712, yes), then the printer data collection cable may append an output format command to the print job in S713, the output format command instructing the printing device to output the printout of the print job in a format specified by the output format command. Step S1113 is optional.

Finally, in step S714, the printer data collection cable passes the print job to the selected printing device.

According to other aspect of this disclosure, the data collection and processing part 27c of the printer data collection cable 27 receives, through the second interface 27b, from each printing device connected to the printer data collection cable 27, printer identification data identifying the connected printing device.

The printer identification data may include, for example, an IP address of the printing device, a name of the printing device, or a location of the printing device.

More specifically, when each printing device is connected to the printer data collection cable 27, the data collection and processing part 27c may transmit a query to the printing device for printer specification data specifying various properties of the printing device, and may receive a response from the attached printing device that includes printer specification data. The data collection and processing part 27c may then process the printer specification data to obtain the printer identification data.

The data collection and processing part 27c may register the printer identification data (and the printer specification data) to track all of the printing devices that have been connected to the printer data collection cable 27, such as the printing device 25 in FIG. 2A. The printer identification data (and printer specification data) may be stored by the data collection and processing part 27c in the storing part 27d.

FIG. 8 shows an example of a printer specification data table containing printer specification data. The printer specification data lists each of the printing devices to which the printer data collection cable 27 has been connected to at some point, including any printing device that the printer data collection cable is currently connected to.

For each of the printing devices, the printer specification data may include, where available, the following information corresponding to the printing device:
the current location of the printing device;
(ii) the IP address of the printing device;
(iii) whether the printing device is able to print color pages, or only print monochrome pages;
(iv) whether the printing device can print in duplex format or only in simplex format;
(v) whether the printing device supports an N-up printing format;
(vi) the page description language (PDL) formats supported by the printing device; and
(vii) the current status of the printing device, such as whether the printing device is 'ready' (i.e. currently connected to the printer data collection cable) or 'not connected'.

It will be seen that the printer specification data received from the printing device specifies various properties of the printing device, and may include printer identification data (i.e. an IP address, name or location of the printing device).

For the printing device Ricoh Aficio 456, for example, it can be seen that the location of the printing device is the first floor lobby, the IP Address of the printing device is 456.00.111.0, the printing device is able to print in color, the printing device is able to print in duplex format, the printing device supports an N-Up printing format, the printing device supports the PostScript page description language format, and the status of the printing device is 'ready' (i.e. printing device is currently attached to the printer data collection cable).

Thus, the printer data collection cable of this disclosure maintains and registers printer identification data information. This information may be shared with the terminal 22, so that printing devices are registered on both the device management cable 27 and the terminal 22. This is in contrast to conventional systems, where printing devices are generally only registered on dedicated printer servers, and not client terminals.

The printer specification data may include only one or a select number of the categories of information identified above, or may include addition printer specification properties not explicitly disclosed herein. The content of the printer specification data may depend in part on the information received by the data collection and processing part 27c from each printing device that is connected to the printer data collection cable 27.

With further reference to the printer specification data depicted in FIG. 8, it will be apparent that the data collection and processing part 27c of the printer data collection cable 27 registers, for each printing device, information specifying print job formats acceptable to the printer. This includes, for example, the information in the printer specification data specifying the page description language (PDL) formats supported by the printer.

Thus, according to another aspect of this disclosure, when the print job received at the printer data collection cable 27 from the terminal 22 is in a format that is not one of the print job formats acceptable to the printing device, the data collection and processing part 27c converts the print job received from the terminal to a converted print job that is in one of the print job formats acceptable to the printing device. The data collection and processing part 27c passes the converted print job to the printing device 25, through the second interface 27b.

In particular, when the data collection and processing part 27c receives a print job from the terminal 22 through the first interface 27c, the data collection and processing part 27c attempts to determine a format of the print job. This may be achieved by analyzing the print job data of the print job, where the print job data discloses that the associated print image data is in a certain format, such as the Printer Command Language (PCL) format or the PostScript format, for example. The data collection and processing part 27c then determines whether the format of the print job is a format acceptable to the printing device 25. This may be achieved by comparing the format of the print job with the printer specification data that specifies one or more print job formats acceptable to the printing device.

If the printer data collection cable determines that the format of the received print job does not match one of the print job formats acceptable to the printing device, the data collection and processing part 27c converts the print job to a converted print job that is in one of the formats acceptable to the printing device, as identified in the printer specification data. If the printer data collection cable determines that the print job received from the terminal is in a format that is acceptable to the printing device, then the printer data collection cable does not convert the print job.

Figure 9A:
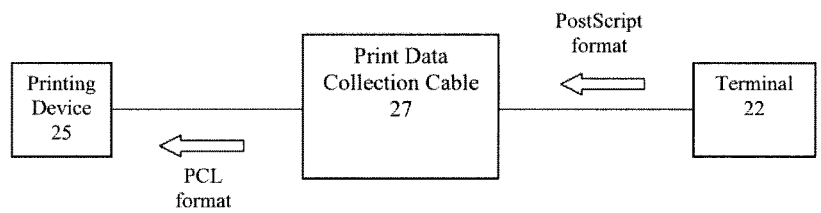
FIGS. 9A and 9B depict aspects of another exemplary embodiment of this disclosure.

With reference to FIG. 9A for example, it may be seen that a terminal 22 transmits a print job to the printer data collection cable 27 in PostScript format. In this case, the printing device 25 is only able to accept print jobs in the PCL format. As a result, the printer data collection cable 27 converts the print job in PostScript format into a converted print job in PCL format, and then transmits the print job in PCL format to the printing device 25.

Figure 9B:
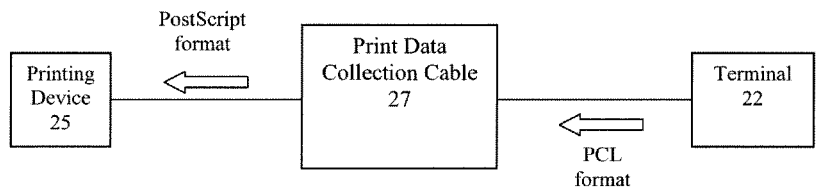

In another example, as depicted in FIG. 9B, it may be seen that the terminal 22 transmits a print job to the printer data collection cable 27 in PCL format, while in this case the printing device 25 is only able to accept print jobs in the PostScript format. As a result, the printer data collection cable 27 converts the print job in PCL format into a converted print job in PostScript format, and then transmits the print job in PostScript format to the printing device 25.

Thus, whereas the simple USB printer cables of the prior art are unable to convert the format of a print job being passed from a terminal to a printing device, the printer data collection cable of this disclosure is able to convert a print job issued by a terminal into a converted print job in a format that is acceptable to the printing device.

In some situations, the printer data collection cable may receive an unformatted print job from a terminal. The print job may be unformatted because the terminal does not have any suitable printer drivers.

Thus, the printer data collection cable also determines whether a print job received from a terminal is unformatted. If this is the case, the printer data collection cable converts the print job received from the terminal to a converted print job that is in one of the print job formats acceptable to the printing device, and passes the converted print job to the printing device.

As a part of this aspect, the printer data collection cable may determine whether a printer driver is required for converting the unformatted print job received from the terminal. If it is determined that a printer driver is required, the printer data collection cable may communicate (through a wireless network, for example) with a driver database, in order to download the necessary driver. The driver database may be any database that stores a plurality of drivers, such as an online driver repository associated with a specific manufacturer of printers. The printer data collection cable uses the downloaded printer driver to convert the unformatted print job into a converted print job in a format acceptable to the printing device.

Figure 10A:
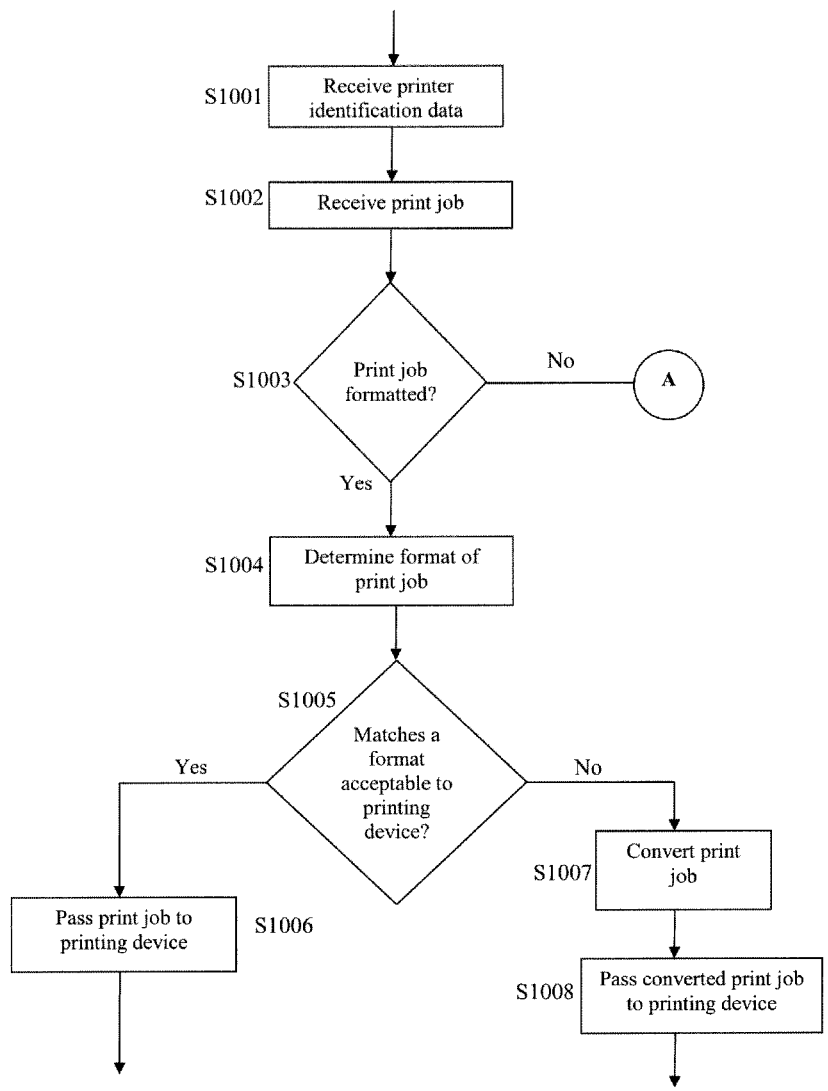
FIGS. 10A and 10B shows a flow chart of a more detailed workflow on a printer data collection cable side, in another exemplary embodiment.
Figure 10B:
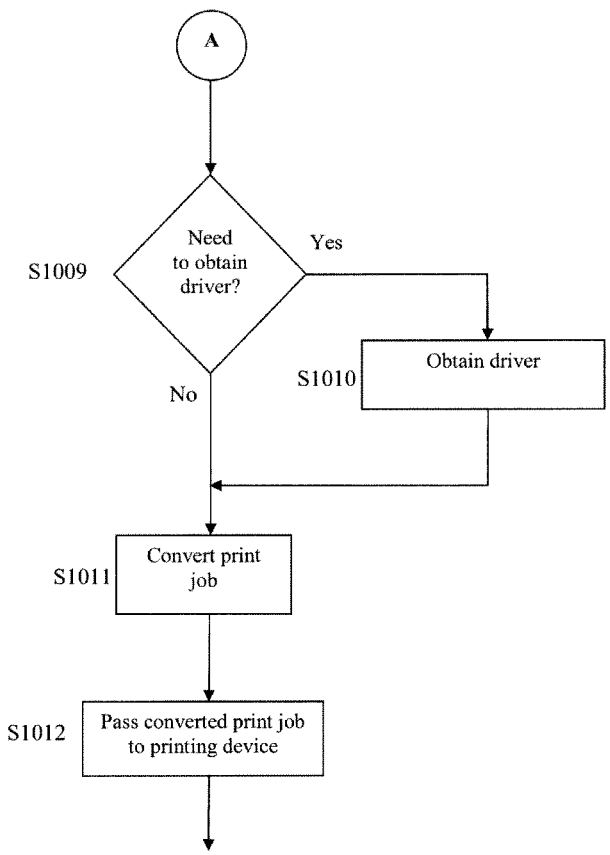

In FIGS. 10A and 10B, a flow chart is shown illustrating an example of a workflow on a printer data collection cable side (such as the printer data collection cable 27 in FIG. 6).

In step S1001, the printer data collection cable receives printer specification data from a printing device that specifies various properties of the printing device. In particular, the printer specification data may include printer identification data identifying the printing device, and also information indicating print job formats acceptable to the printing device. The printer data collection cable registers the printer specification data and printer identification data to track all of the printing devices that have been connected to the printer data collection cable.

In step S1002, the printer data collection cable receives a print job from a terminal.

In step S1003, the printer data collection cable determines whether the print job received from a terminal is formatted. If the print job is not formatted (S1003, no), then processing proceeds to step S1009.

If the print job is formatted (S1003, yes), then the printer data collection cable determines a format of the print job in S1004. In step S1005, the print data collection cable then determines whether the format of the print job matches a format acceptable to the printing device.

If the format of the print job matches a format acceptable to the printing device (S1005, yes), then the print data collection cable passes the print job to the printing device in S1006, and the workflow ends. If the format of the print job does not match a format acceptable to the printing device (S1005, no), then the print data collection cable converts the print job received from the terminal to a converted print job that is in one of the print job formats acceptable to the printing device (S1007), and passes the converted print job to the printing device (S1008), after which the workflow ends.

Referring to step S1009, the printer data collection cable determines whether a printer driver is required for converting the unformatted print job received from the terminal.

If it is determined that a printer driver is not required (S1009, yes), the workflow proceeds to S1011. If it is determined that a printer driver is required (S1009, yes), the printer data collection cable obtains the appropriate driver (by communicating with a driver database, for example).

In S1011, the print data collection cable converts the print job received from the terminal to a converted print job that is in one of the print job formats acceptable to the printing device. The cable then passes the converted print job to the printing device (S1012), after which the workflow ends.

Figure 11:
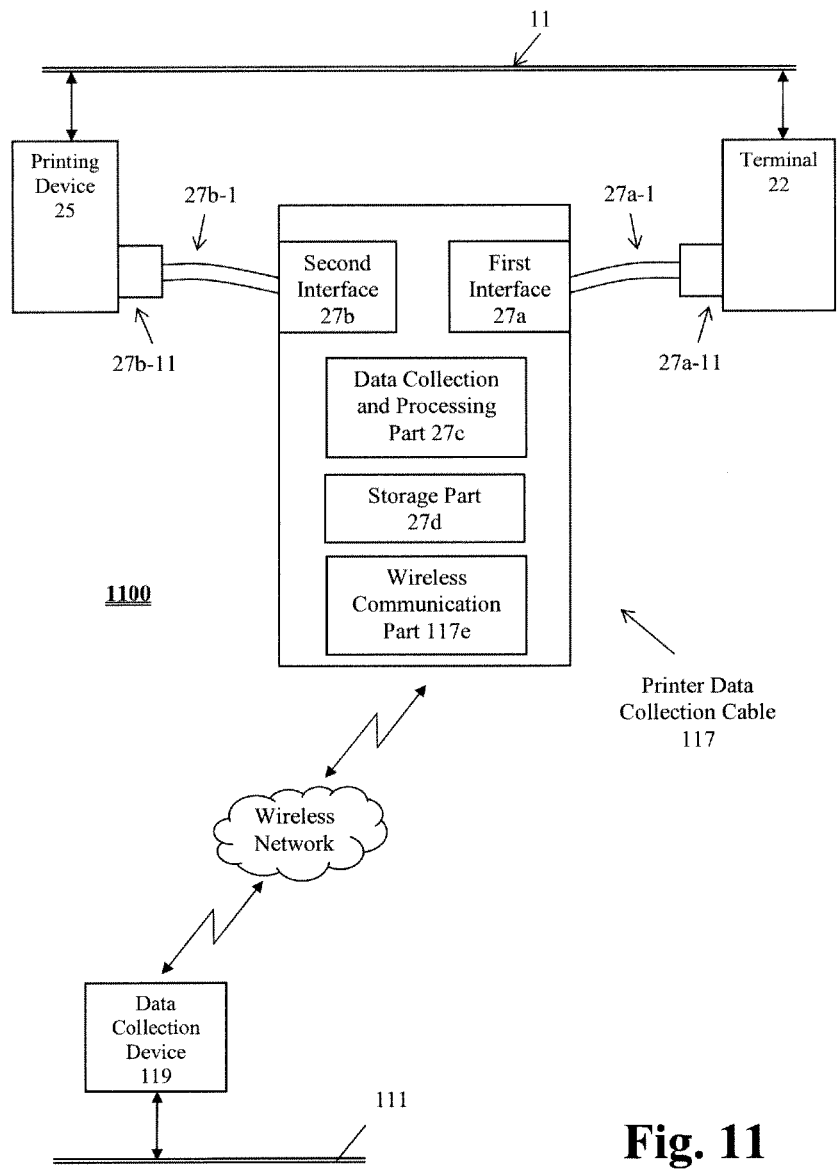
FIG. 11 shows a block diagram of a system, according to another exemplary embodiment of this disclosure.

Turning now to FIG. 11, there is shown schematically a system 1100 for managing and exchanging printer data, according to another exemplary embodiment of this disclosure.

System 1100 includes a terminal 22, a printing device 25, a printer data collection cable 117 and an external data collection device 119.

The terminal 22 and the printing device 25 may be substantially similar to those of FIG. 2A.

The printer data collection cable 117 may be substantially similar to the printer data collection cable 27 of FIGS. 2A-2B. The printer data collection cable 117 also includes a wireless communication part 117e configured to communicate collected print job data, upon demand or at a specific time, to the external data collection device 119.

In particular, the printer data collection cable 117 registers a data reporting setting to one of push-type reporting and pull-type reporting. When the data reporting setting is set to the push-type reporting, the printer data collection cable 117 communicates collected print job data (stored in the storing part 27d) at a specific time to the external data collection device 119. For example, the printer data collection cable may communicate the data at the beginning of every hour, at the beginning of every day, etc. . . .

When the data reporting setting is set to the pull-type reporting, the printer data collection cable 117 communicates the collected print job data to the external data collection device 119 upon receipt of a request command from the external data collection device 119. The command may be in the form of a Simple Network Management Protocol (SNMP) command, for example.

The wireless communication part 117e may also communicate device identification data in addition to the collected print job data, to the external data collection device 119, the device identification data uniquely identifying the printer data collection cable 117. Furthermore, the wireless communication part 117e may communicate any information stored in the storing part 27d of the printer data collection 117, such as print images of print jobs, printer specification data, and user print count data.

Thus, while conventional USB printer cables make it difficult to obtain accurate statistical and accounting records regarding print jobs that have been performed on a printing device, the printer data collection cable of this disclosure makes it easy to obtain a centralized record of collected print job data (such as which users have printed which documents, how many color pages was printed by each user, and so forth). Such collected print job data may be used for accounting and billing purposes, for example.

In addition to the push-type reporting and pull-type reporting data reporting settings, the printer data collection cable 117 may also communicate the collected print job data to the external data collection device 119 whenever a selected amount of new print job data is collected. Thus, during time periods when a large number of print jobs are being submitted, the printer data collection cable will communicate print job data with greater intensity than at time periods when little or no print jobs are being submitted.

The external data collection device 119 can be configured in software or hosted on any computing device, including but not limited to a personal, notebook or workstation computer, a kiosk, a PDA (personal digital assistant), a MFD, a server, a mobile phone or handset, another information terminal, etc., that can communicate through the network 11 with other devices. While the data collection device is shown as being external to the terminal 22, the data collection device may in fact be executed on the terminal 22.

While the collected print job data may be communicated wirelessly by the printer data collection cable 117 to the external data collection device 119 as described above, the collected print job data may instead (or in addition) be transmitted to another device (such as terminal 22). Thereafter, this other device such as terminal 22 may communicate the collected print job to the external data collection device.

Figure 12:
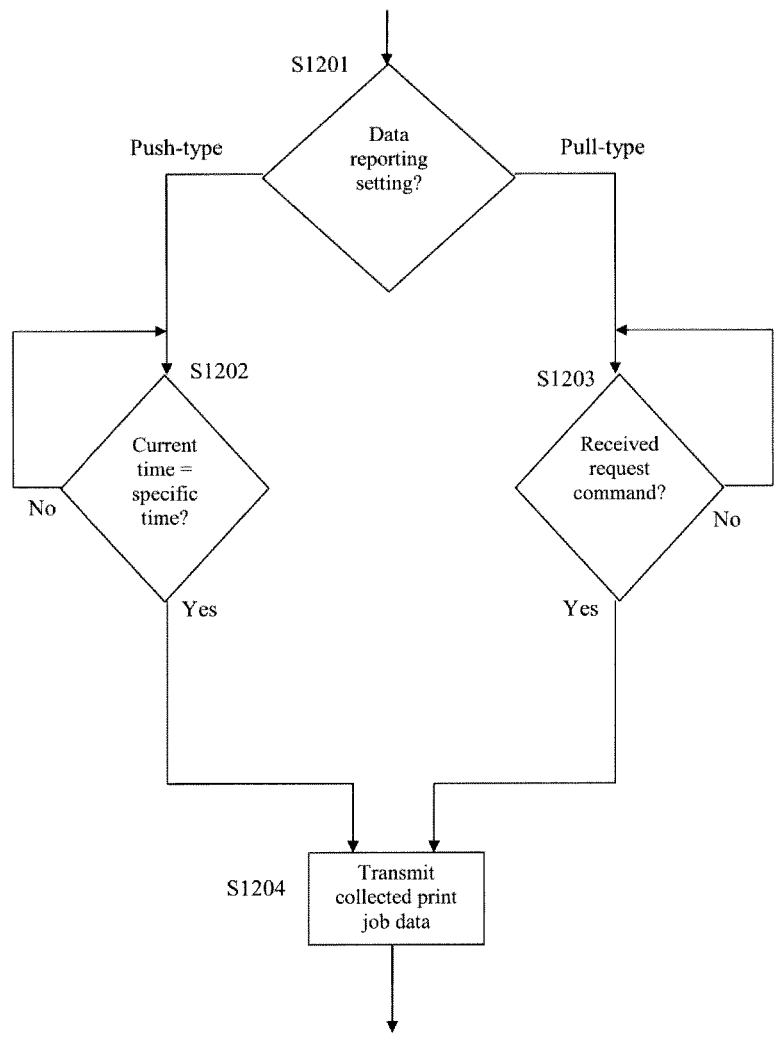
FIG. 12 shows a flow chart of a more detailed workflow on a printer data collection cable side, in another exemplary embodiment.

In FIG. 12, a flow chart is shown illustrating an example of another workflow on a printer data collection cable side (such as the printer data collection cable 27 in FIGS. 2A and 2B). Specifically, this workflow may commence after the workflow depicted in FIG. 3 has been completed.

In step S1201, the printer data collection cable determines whether the data reporting setting is set to either push-type reporting or pull-type reporting If it is determined in S1201 that the data reporting setting is to push-type reporting, then the workflow proceeds to S1202. If it is determined in S1201 that the data reporting setting is to pull-type reporting, then the workflow proceeds to S1203.

In S12302, the printer data collection cable determines if the current time is equal to the specific time designated for communicating collected print job data to an external data collection device.

If it is determined that the current time is equal to the specific time (S1202, yes), then the printer data collection cable communicates the collected print job data to the external data collection device (S1204), and the workflow ends. If it is determined that the current time is not equal to the specific time (S1202, no), then the printer data collection cable continues to determine if the current e is equal to the specific time designated for communicating collected print job data (S1202).

In S1203, the printer data collection cable determines if a request command for collected print job data has been received from an external data collection device.

If it is determined that the request command has been received (S1203, yes), then the printer data collection cable communicates the collected print job data to the external data collection device (S1204), and the workflow ends. If it is determined that a request command has not been received (S1203, no), then the printer data collection cable continues to determine if a request command for collected print job data has been received (S1203).

While the example shown in FIG. 2A and FIG. 11 include one printer data collection cable 27, one terminal 22 and one printing device 25, such numbers of cables, terminals and printing devices are arbitrary and are selected as an example in order to facilitate discussion, and that the subject matter of this disclosure can be implemented in a system including one or more cables, terminals and printing devices. Other devices, such as scanners, printers and multi-function devices (MFDs) may also be connected to the network 11, as is well known in the art.

While the terminal 22 and the printer 25 are depicted in FIG. 2A and FIG. 11 as being connected to a network 11, the above-mentioned aspects can also apply if either the terminal 22 or the printer 25 (or both the terminal and the printer) are not connected to the network 11.

The terminal 22 can be any computing device, including but not limited to a personal, notebook or workstation computer, a kiosk, a PDA (personal digital assistant), a MFD (multi-function device), a server, a mobile phone or handset, another information terminal, etc., that can communicate through the network 11 with other devices.

The printing device 25 can be any image forming apparatus or image output apparatus configured to output a hardcopy printout of a print job. For example, the printing device may be a printer, a copier machine, a MFD (multi-function device), a MFP (multi-function product), and so on.

The network 11 can include one or more of a secure intranet or extranet local area network, a wide area network, any type of network that allows secure access, etc., or a combination thereof. Further, other secure communications links (such as a virtual private network, a wireless link, etc.) may be used as well in the network 11. In addition, the network 1 preferably uses TCP/IP (Transmission Control Protocol/Internet Protocol), but other protocols can also be used. How devices can connect to and communicate over the network 11 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 13:
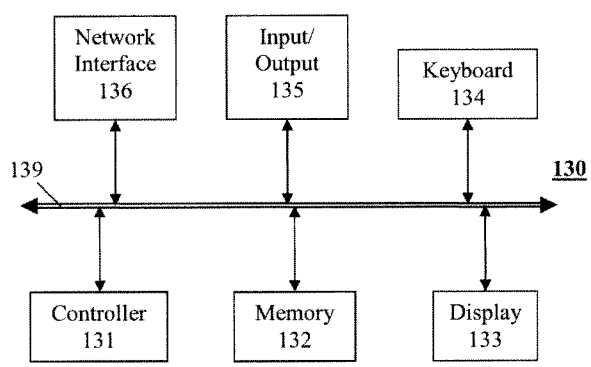
FIG. 13 shows a block diagram of an exemplary configuration of a terminal.

An example of a configuration of the terminal 22 (for example, as a computer) is shown schematically in FIG. 13. In FIG. 13, computer 130 includes a controller (or central processing unit) 131 that communicates with a number of other components, including memory 132, display 133, keyboard (and/or keypad) 134, other input/output (such as mouse, touchpad, stylus, microphone and/or speaker with voice/speech interface and/or recognition software, etc.) 135, and network interface 136, by way of internal bus 139.

The memory 132 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 136 provides a connection (for example, by way of an Ethernet connection or other network connection which supports any desired network protocol such as, but not limited to TCP/IP, IPX, IPX/SPX, or NetBEUI) to network 11.

A user interface is provided and is configured through software natively or received through a network connection, to allow the user to access electronic data or content on the terminal and/or via the network, interact with network-connected devices and services (such as the printing device 25), enjoy other software-driven functionalities, etc. For example, a browser (such as Internet Explorer™, Netscape Navigator™, a proprietary browser, etc.) may be provided on the terminal so that a user of the terminal can use browsing operations to communicate with the printing device 25, and access other data or content.

Additional aspects or components of the computer 130 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

As mentioned above, the terminal 22 is not limited to a personal computer, but can be manifested in a form of any of various devices that can be configured to communicate over a network and/or the Internet.

Figure 14:
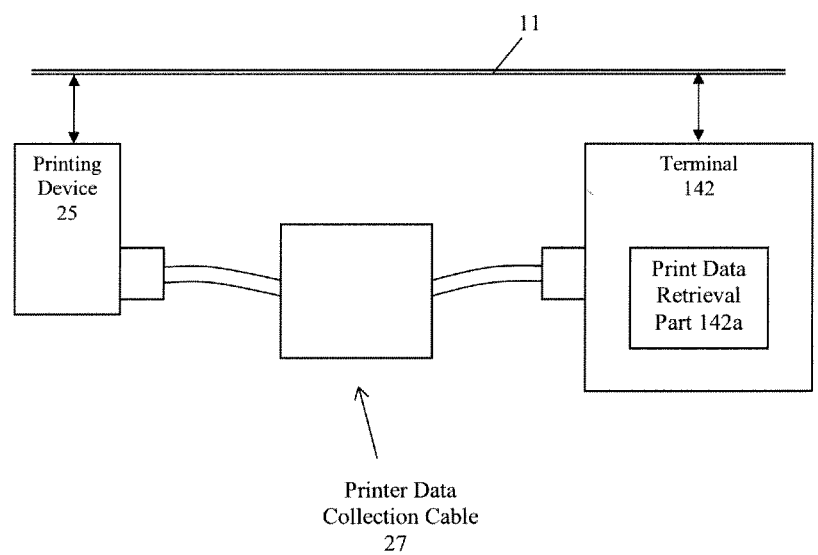
FIG. 14 shows a block diagram of a system, according to another exemplary embodiment of this disclosure.

Turning now to FIG. 14, there is shown schematically a system 1400 for managing and exchanging documents and data, according to another exemplary embodiment of this disclosure.

System 1400 includes a terminal 142, a printing device 25, and a printer data collection cable 27.

The printing device 25 and the printer data collection cable 27 may be substantially similar to those of FIG. 2A. In particular, the printer data collection cable 27 may pass a print job received from the terminal 142 to the printing device 25, while collecting print job data from the print job and storing the print job data locally. The cable 27 may also store, for each print job, print images from the print job so that the print images are available for retrieval by the terminal 142.

The terminal 142 may be substantially similar to the terminal 22 described with reference to FIG. 2A. However, the terminal 142 also includes a print data retrieval part 142a that is configured to communicate a retrieval command to the printer data collection cable 27 to retrieve specified print job data or print images stored locally on the cable 27. When the retrieval command is received at the printer data collection cable 27, the data collection and processing part 27c (not shown) of the printer data collection cable 27 returns the specified data through the first interface 27a (not shown) of the cable 27 to the terminal 142, in accordance with the retrieval command from the print data retrieval part 142a of the terminal 142.

Figure 15:
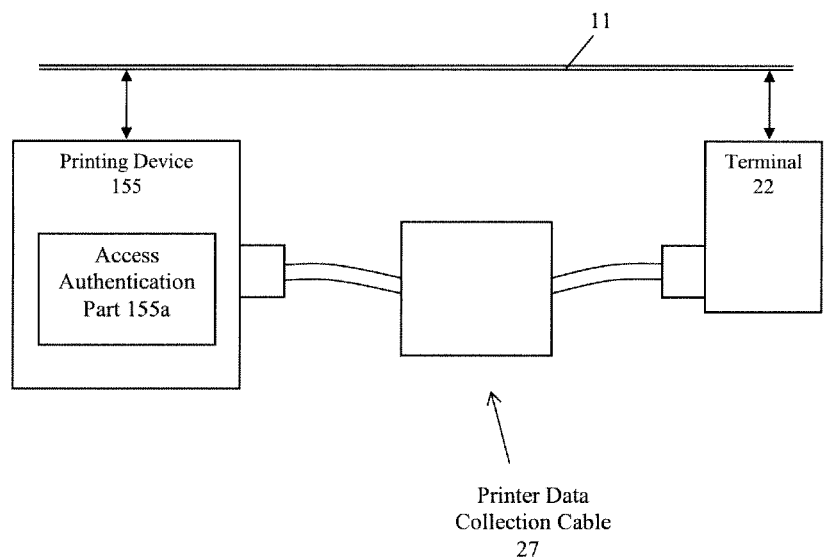
FIG. 15 shows a block diagram of a system, according to another exemplary embodiment of this disclosure.

Turning now to FIG. 15, there is shown schematically a system 1500 for managing and exchanging documents and data, according to another exemplary embodiment of this disclosure.

System 1500 includes a terminal 22, a printing device 155, and a printer data collection cable 27.

The terminal 22 and the printer data collection cable 27 may be substantially similar to those of FIG. 2A. In particular, the printer data collection cable 27 may pass a print job received from the terminal 22 to the printing device 155, while collecting print job data from the print job and storing the print job data locally. The cable 27 may also store, for each print job, print images from the print job so that the print images are available for retrieval by the terminal 22.

The printing device 155 may be substantially similar to the printing device 25 described with reference to FIG. 2A. However, the printing device 155 also includes an access authentication part 155a. The printer data collection cable 27 registers an access code and transmits the access code along with the print job to the printing device 155, and the printing device processes the print job only if the access authentication part 155a authenticates the print job based on the received access code.

The printer data collection cable 27 may include a network interface, and the printer data collection cable 27 requests and receives the access code through a network from an external authentication code source (not shown).

The access authentication part 155a of the printing device 155 may compare the received access code to verified access codes, which are stored remotely or locally in the printing device 155, in order to authenticate the print job. The printing device 155 may request and receive the verified access codes through a network from an external authentication code source (not shown).

Figure 16:
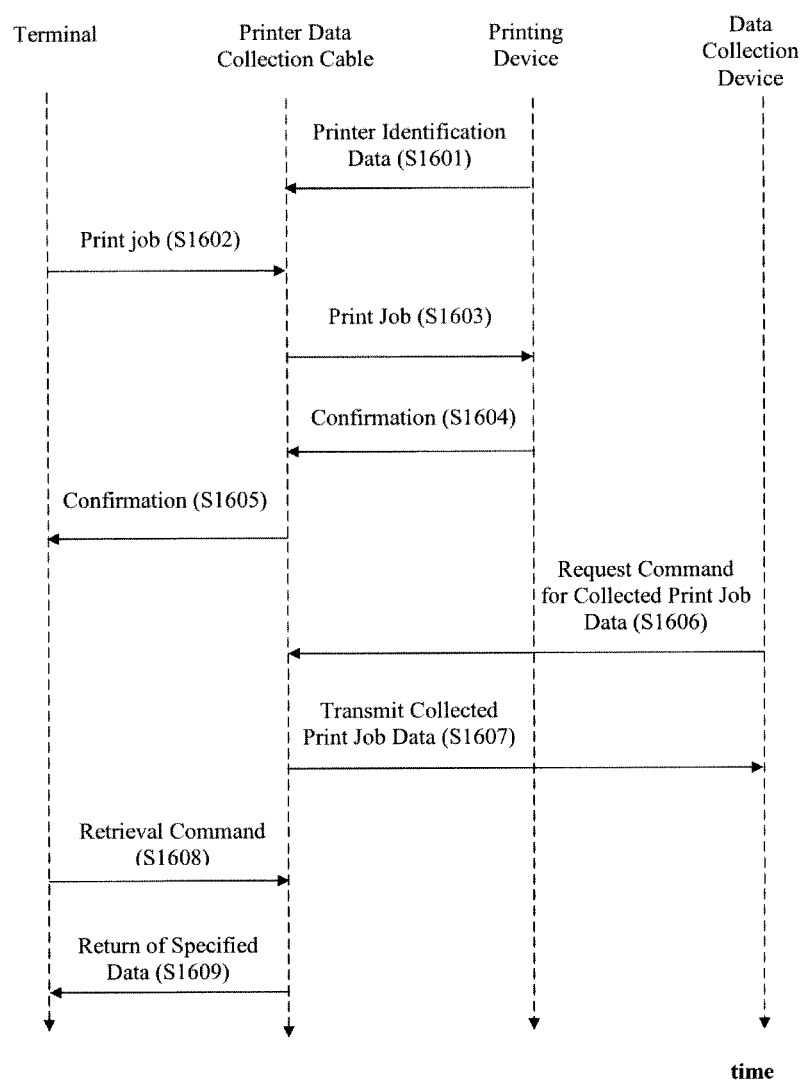
FIG. 16 shows a schematic view of an example of data flow in an exemplary embodiment.

Turning now to FIG. 16, a schematic view of an example of data flow in an exemplary embodiment is presented.

Firstly, in step S1601 the printing device transmits printer specification data specifying various properties of the printing device, to the printer data collection cable. The printer specification data may include printer identification information identifying the printing device, and also information indicating print job formats acceptable to the printing device.

Then, in step S1602 the terminal transmits a print job to the printer data collection cable. The print data may include print images and print job data. The steps 1601 and 1602 may be interchanged. Thereafter, in S1603, the printer data collection cable passes the print job received from the terminal to the printing device. While the printer data collection cable is passing the print job to the printing device, the printer data collection cable collects print ob data and stores the print job data locally on the printer data collection cable.

In step S1604, the printer may receive a print confirmation from the printing device, indicating that the print job has successfully been executed. In step S1605, the printing device may transmit a print confirmation back to the terminal. The print confirmation may be displayed on a display part of the terminal for a user of the terminal to view.

Thereafter, in step S1606, the printer data collection cable receives a request command for collected print job data from the external data collection device. In response, the printer data collection cable transmits the collected print job data to the data collection device in step S1607.

Step S1606 will be performed if a pull-type data reporting setting is registered on the printer data collection cable. If a push-type data reporting setting is registered on the printer data collection cable, then step S1606 may be omitted.

Then in step 1608, the terminal transmits a retrieval command to the printer data collection cable to retrieve specified print job data or print images stored locally on the printer data collection able. In response, the printer data collection cable returns the specified data to the terminal in step S1609.

The above-mentioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A printer data collection system, comprising:
a printing device;
a printer data collection cable configured for wired connections to a terminal and to the printing device, respectively, said printer data collection cable including:
a first interface including a first wired cable, the first wired cable having a first connector at an end thereof conforming to a terminal connector standard, the first interface being configured for communication through the first wired cable with the terminal when the first connector at the end of the first wired cable is connected to the terminal;
a second interface including a second wired cable, the second wired cable having a second connector at an end thereof conforming to a printer connector standard, the second interface being configured for communication through the second wired cable with the printing device when the second connector at the end of the second wired cable is connected to the printing device;
a data collection and processing part configured to pass a print job received through the first interface from the terminal, to the printing device through the second interface, while collecting print job data; and
a storing part configured to store the print job data collected by said data collection and processing part,
wherein the printing device includes an access authentication part, and the printer data collection cable registers an access code and transmits the access code along with the print job to the printing device, and the printing device processes the print job only if the access authentication part authenticates the print job based on the received access code.

2. The printer data collection system of claim 1, wherein the print job passed by the printer data collection cable to the printing device is unaltered from the print job received through the first interface from the terminal.

3. The printer data collection system of claim 1, wherein the storing part stores, for each print job, print images, and the stored print images are available for retrieval.

4. The printer data collection system of claim 1, wherein the data collection and processing part determines based on the received print job, (a) identity of user sending the print job and (b) a number of pages in the print job, and the print job data stored in the storing part for the received print job includes the identity of the user and the number of pages in the received print job.

5. The printer data collection system of claim 4, wherein the data collection and processing part maintains and registers for each of a plurality of specific users, user print count data including a total number of pages printed by a printing device from print jobs submitted by a specific user.

6. The printer data collection system of claim 4, wherein the data collection and processing part maintains and registers for each of the specific users, user print count data including a total number of color print pages printed by a printing device from print jobs submitted by the specific user.

7. The printer data collection system of claim 1, further comprising:
a wireless communication part configured to communicate the collected print job data, upon demand or at a specific time, to an external data collection device,
wherein the printer data collection cable registers a data reporting setting to one of push-type reporting and pull-type reporting, and when the printer data collection cable is set to the push-type reporting, the printer data collection cable communicates the collected print job data at the specific time to the external data collection device, and when the printer data collection cable is set to the pull-type reporting, the printer data collection cable communicates the collected print job data to the external data collection device upon receipt of a command from the external data collection device.

8. The printer data collection system of claim 7, wherein the wireless communication part communicates device identification data in addition to the collected print job data, to the external data collection device, the device identification data uniquely identifying the printer data collection cable.

9. The printer data collection system of claim 7, wherein the wireless communication part communicates user print count data including any one of: a total number of pages printed from print jobs submitted by each of a plurality of specific users; and a total number of color pages printed from the print jobs submitted by each of the plurality of specific users.

10. The printer data collection system of claim 1, wherein the data collection and processing part appends an output format command to the print job passed to the printing device, and the output format command instructs the printing device to output the printout of the print job in a format specified by the output format command, in accordance with a print policy.

11. The printer data collection system of claim 1, wherein the data collection and processing part registers for the printing device, information indicating print job formats acceptable to the printing device, and when the print job received from the terminal is in a format that is not one of the print job formats acceptable to the printing device, the data collection and processing part converts the print job received from the terminal to a converted print job that is in one of the print job formats acceptable to the printing device and passes the converted print job to the printing device.

12. The printer data collection system of claim 1, wherein the data collection and processing part receives through the second interface, from the printing device connected to the printer data collection cable, printer identification data identifying the connected printing device, and the data collection and processing part registers the printer identification data and stores said printer identification data in the storing part, and employs said printer identification data to track said printing device after the printing device has been disconnected from the printer data collection cable.

13. The printer data collection system of claim 1, wherein the printer data collection cable including the first interface and the second interface provides a bi-directional communication medium between the terminal and the printing device, and operation of the printer data collection cable is transparent to the terminal and the printing device.

14. The printer data collection system of claim 1, further comprising a terminal,
wherein the terminal includes a print data retrieval part configured to communicate a retrieval command to the printer data collection cable to retrieve specified print data, and the data collection and processing part of the printer data collection cable returns the specified print data through the first interface to the terminal in accordance with the retrieval command from the print data retrieval part of the terminal.

15. The printer data collection system of claim 1, further comprising a terminal,
wherein the terminal, without a print driver for the printing device, communicates the print job to the printer data collection cable, and the data collection and processing part registers for the printing device, information indicating print job formats acceptable to the printing device, and when the data collection and processing part receives the print job from the terminal, the data collection and processing part converts the print job received from the terminal to a converted print job that is in one of the print job formats acceptable to the printing device and passes the converted print job to the printing device.

16. The printer data collection system of claim 1, further comprising a terminal,
wherein the terminal registers an access code and transmits the access code along with the print job to the printer data collection cable, and the data collection and processing part passes the print job, received from the terminal, to the printing device, only if the data collection and processing part authenticates access by the terminal based on the access code previously transmitted by the terminal.

17. The printer data collection system of claim 1, further comprising a terminal,
wherein the terminal includes a network interface and requests and receives an access code through a network from an authentication code source which is external to the printer data collection system.

* * * * *